(12) United States Patent
Tyrer et al.

(10) Patent No.: US 6,416,109 B1
(45) Date of Patent: Jul. 9, 2002

(54) CANOPY RAIN COVER FOR A GOLF CART

(76) Inventors: Stephen Edward Tyrer, 147 Taft Crescent, Centerport, NY (US) 11721; Richard Kenneth Harris, 2395 Hay Creek Dr., Pinckney, MI (US) 48169

( * ) Notice: Subject to any disclaimer, the term of this patent is extended or adjusted under 35 U.S.C. 154(b) by 0 days.

(21) Appl. No.: 09/769,858

(22) Filed: Jan. 25, 2001

(51) Int. Cl.[7] .................. B60P 7/02; B60J 1/00
(52) U.S. Cl. .................. 296/100.11; 296/77.1; 296/83; 280/DIG. 5
(58) Field of Search .............. 296/100.11, 100.16, 296/100.15, 100, 141, 138, 77.1, 135, 99.5; 135/88, 88.09; 280/DIG. 5

(56) References Cited

U.S. PATENT DOCUMENTS

| | | | | | |
|---|---|---|---|---|---|
| 4,830,037 A | * | 5/1989 | Held | ............... | 280/DIG. 5 |
| 4,846,524 A | * | 7/1989 | Gerber | ............... | 296/116 |
| 5,094,500 A | * | 3/1992 | Maypole et al. | ............... | 296/102 |
| 5,190,340 A | * | 3/1993 | Nuscher | ............... | 296/99.1 |
| 5,217,275 A | * | 6/1993 | Ridge | ............... | 296/77.1 |
| 5,310,235 A | * | 5/1994 | Seymore et al. | ............... | 296/77.1 |
| 5,388,881 A | * | 2/1995 | Spencer et al. | ............... | 296/77.1 |
| 5,393,118 A | * | 2/1995 | Welborn | ............... | 296/77.1 |
| 5,531,478 A | * | 7/1996 | Houston et al. | ............... | 296/143 |
| 5,588,690 A | * | 12/1996 | Showalter | ............... | 296/77.1 |
| 5,688,018 A | | 11/1997 | Simpson | | |
| 5,741,041 A | * | 4/1998 | Sullivan | ............... | 296/100 |
| 5,762,308 A | * | 6/1998 | Bryan | ............... | 248/214 |
| 5,788,317 A | * | 8/1998 | Nation | ............... | 296/141 |
| 6,007,134 A | * | 12/1999 | Weston | ............... | 296/83 |
| 6,068,325 A | * | 5/2000 | Hughes | ............... | 296/100.16 |
| 6,199,932 B1 | * | 3/2001 | Welsh et al. | ............... | 296/77.1 |
| 6,216,714 B1 | * | 4/2001 | Tucker | ............... | 280/DIG. 5 |
| 6,227,217 B1 | * | 5/2001 | Peta | ............... | 296/83 |
| 6,227,603 B1 | * | 5/2001 | Brock | ............... | 296/100.14 |

* cited by examiner

*Primary Examiner*—Ken Patel
(74) *Attorney, Agent, or Firm*—Michael T. York (57) ABSTRACT

An improved canopy assembly for attaching a rearwardly extending protective canopy to a motorized golf cart of the type having a top covering the passenger seating area and an uncovered bag storage area reward of the seating area that includes a golf bag support bracket that prevents the golf bags from tipping over. The canopy assembly includes a mounting channel secured to the rearward portion of the top of the golf cart, a base member that attaches directly to the golf bag support bracket, a frame that pivotally attaches to the base member and a sheet of flexible water resistant material attached to the channel and suspended over the frame. The canopy assembly may be extended where the protective canopy substantially covers the cart's golf bag storage area protecting the bags from rainfall. The canopy assembly may be folded where the protective canopy is moved out of the way allowing golf clubs to be removed from the golf bags without hitting the canopy assembly.

22 Claims, 9 Drawing Sheets

CANOPY RAIN COVER FOR A GOLF CART

FIELD OF THE INVENTION

This invention relates generally to the field of golf cart canopy covers, specifically to an improved canopy cover that protects golf bags and clubs from rain.

DESCRIPTION OF THE RELATED ART

Canopy covers in the past have been utilized to protect golf bags and clubs located in the rear bag storage compartment of golf carts from rain and damp weather conditions. It is well known in the sport that wet golf club grips can hinder the performance of the player and is undesirable.

Generally, canopy covers attach to the back of the cart's top and to the cart's frame section that supports the top. The connection to the top is typically made with an extruded channel member that accepts the top edge of the canopy. The connection to the cart's frame is made using a structural base member that serves as a mounting base for a frame supporting the canopy. The base member generally attaches directly to the frame of the cart. However, different cart makes and models have different frame structures making it necessary to change the canopy's base member's geometry to properly mate with the cart's structural frame.

An example of a canopy cover to protect golf bags and clubs is U.S. Pat. No. 4,830,037 to William T. Held. This canopy cover discloses a cover that includes a channel that attaches to the back of the cart's top, base members that attach to the frame of the cart supporting the top of the cart and a canopy structure that supports the flexible canopy and is pivotally attached to the base member. As can be seen in the drawings and description of this patent, the base members attached to the cart frame are specifically designed for a particular style cart with a specific frame. It can be easily understood that if the frame design was substantially different as with another cart make or model the base members of the canopy would likely need to be changed to enable them to still attach to the frame. In fact, as detailed in the description section in this patent, the base members utilize two specific preexisting holes in the cart's frame that must be located in a specific area in order for the canopy's base members to attach. Additionally, it can be seen that the canopy assembly of this device is complicated, requiring a number of different processes to produce a relatively large number of parts and a significant amount of assembly. This results in a relatively expensive product making it burdensome for a perspective user to purchase. The canopy assembly described in this patent cannot take advantage of the ability to produce one canopy assembly for many different types of golf carts since different canopy base members would need to be designed in order to attach to a variety of frames. In addition, the relatively large number of fasteners and other components reduces the robustness and reliability of the invention described in this patent, increasing the likelihood of a loose fastener caused by normal cart usage.

Another example of a cover to protect golf bags and clubs is U.S. Pat. No. 5,190,340 to Edwin H. Nuscher. This patent discloses a cover that includes a L-shaped top extending rearwardly from the top of the golf cart. In this patent the cover is supported by L-shaped support bars that attach to the top assembly of the cart. The cover is substantially elevated above the top of the cart to allow access to the golf clubs in the golf bags. However, one can easily see that this type of cover has several key disadvantages. The substantial elevation of the cover above the cart's top would severely limit the cart's usage in heavily wooded areas where it is desirable for the cart to travel under low tree branches. The branches could collide into the described cover causing damage to both the cover and the tree. Additionally, wind could easily carry rain on an angle from the sides of the cover into the bag storage area getting the golf bags and clubs wet. The L-shaped cover would also slow the cart's mobility when traveling against the wind since the cover has a large face that is not aerodynamic allowing the wind to hinder to cart's performance. The L-shaped roof is also not aesthetically pleasing to the eye making its marketability questionable.

Another example of an enclosure to protect golf bags and clubs is U.S. Pat. No. 5,588,690 to Jerry M. Showalter. This patent discloses an enclosure that includes a roof panel, a hem portion coupled to the roof panel, a back cover coupled to the roof panel and a second back cover coupled to the roof panel. The invention described in this patent has several key disadvantages. The enclosure includes a roof panel that overlays the existing roof on the golf cart. This requires a lot of material that is relatively expensive leading to a more expensive product. The enclosure lacks a frame structure to suspend it substantially over the clubs resulting in a cover that drapes over the clubs and bag. When the cover is wet, the player must roll or fold it up to expose the golf bags underneath. This action would likely result in the user getting his or her hands wet. Additionally, the enclosure is not aesthetically pleasing since it looks sloppy.

Another example of a cover to protect golf bags and clubs is U.S. Pat. No. 6,068,325 to Charles A Hughes. This patent discloses a cover that includes four panels that are sewn together along their edges to form a large, rectangularly-shaped box that is secured to the frame of the cart that supports the roof and to the back of the roof covering the seating compartment. The back panel of this cover contains a bag for storing the back panel after it has been folded up. However, this type of cover has a number of disadvantages. To access the covered clubs the player is forced to unhook two hook and loop straps and roll the wet cover up. This is far from convenient and would likely result in the player and possibly the clubs getting wet from the wet cover. The procedure is also slow requiring a significant amount of time. The player must unhook the cover, roll it up and let the cover back down while the player hits the ball. The procedure has to be repeated to return the club back into the golf bag.

Another example of a roll-up type cover to protect golf bags and clubs is U.S. Pat. No. 5,741,041 to Diane Sullivan. This patent discloses a roll-up type cover that utilizes a shock cord to attach the bottom of the cover to the cart and hooks to attach the top of the cover to the back edge of the cart's top. This cover has similar disadvantages as U.S. Pat. No. 6,068,325 in that the player must bend over and unhook two shock cord hooks that extend from the bottom edge of the cover to allow the player to roll the cover up. Again, it is likely that the player will get wet during this procedure and it is time consuming. Additionally, the cover lacks a structural frame making it sloppy looking and not aesthetically pleasing.

Another example of a roll-up cover to protect golf bags and clubs is U.S. Pat. No. 5,688,018 to John Albert Simpson. This patent discloses another roll-up type cover similar to U.S. Pat. No. 5,741,041 and shares the same disadvantages.

BRIEF SUMMARY OF THE INVENTION

The present invention provides an improved canopy assembly for attachment onto a golf cart to protect golf bags and clubs located in the back of the cart from rain. The invention allows the user to quickly extend the canopy to protect clubs and bags from rainfall and just as quickly fold up the cover to allow access to the clubs. Additionally, the invention enables the user to quickly attach and detach the canopy onto the cart's golf bag support bracket on a variety of different golf cart makes and models since the invention utilizes a versatile attachment method.

It is to be understood that both the preceding summary and the following detailed description are intended to be exemplary and explanatory and are intended to provide a further explanation of the invention claimed.

The invention will best be understood by reference to the following detailed description read in conjunction with the accompanying drawings.

OBJECTS AND ADVANTAGES OF INVENTION

Accordingly, several objects and advantages of the present invention are:

(a) to provide a canopy rain cover assembly that mounts to a variety of different golf cart types without the need for additional or different parts;

(b) to provide a canopy rain cover assembly that is inexpensive having substantially fewer parts than the currently known covers that have canopy support frames that allow the canopy to be folded-up;

(c) to provide a canopy rain cover assembly that is robust and durable;

(d) to provide a canopy rain cover assembly that is simple to manufacture requiring less processing steps than currently known covers; and (e) to provide a canopy rain cover assembly that can be rapidly extended to protect the bag storage area from rainfall and just as rapidly folded up to allow access to the bag storage area.

BRIEF DESCRIPTION OF SEVERAL VIEWS OF THE DRAWINGS

These and other advantages of the present invention will become more fully apparent as the following description is read in conjunction with the drawings, wherein.

DETAILED DESCRIPTION OF THE PREFERRED EMBODIMENT

Figure 1:
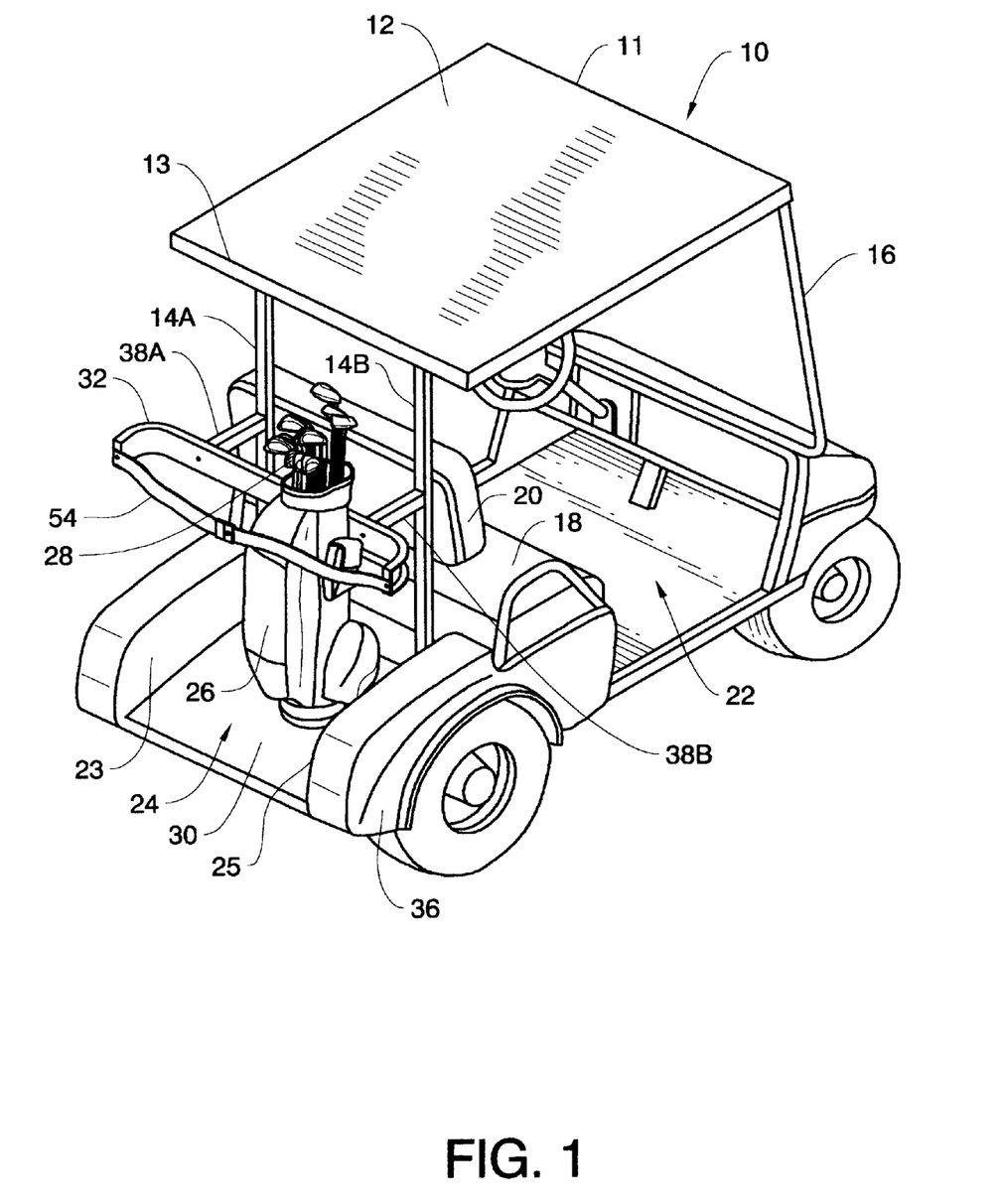
FIG. 1 is a rear perspective view of a golf cart in which an embodiment of the present invention may be used.
Figure 3:
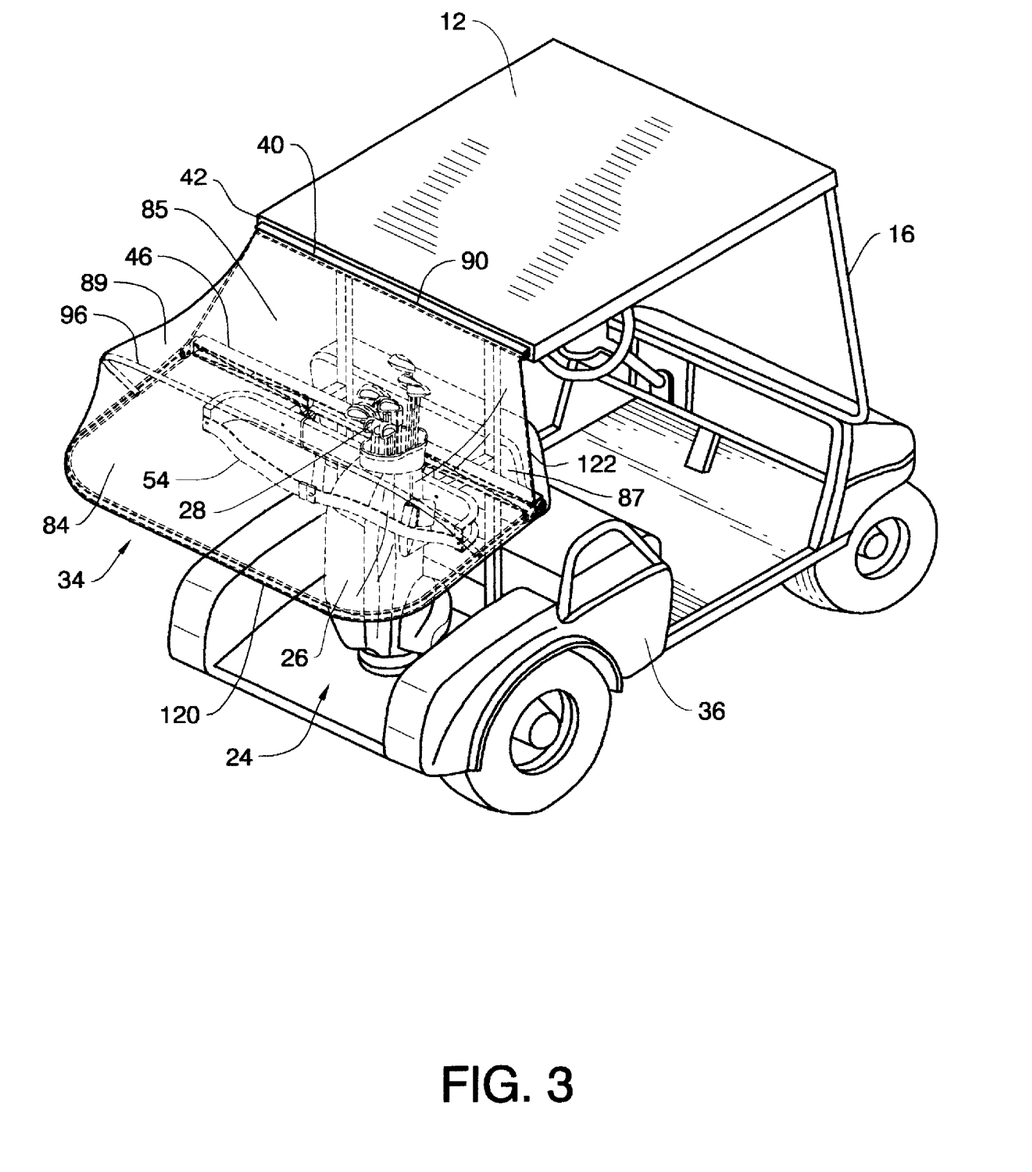
FIG. 3 is a rear perspective view of the golf cart with the embodiment of the present invention attached with the cover extended to protect the golf bag and clubs from rain.

FIG. 1 shows a perspective view of a motorized golf cart 10 to which an embodiment of a canopy attachment in accordance with the present invention, generally indicated as a canopy assembly 34 in FIG. 3, can be attached. Cart 10 has a top 12 that is attached to the upper ends of rear frame members 14A and 14B and the upper portion of a front frame member 16 using fasteners. Top 12 is preferably a molded plastic part and is used to protect passengers sitting in a passenger compartment 22 from rain. The passengers sit on a seat 18 with their back resting on a seat back 20. Behind seat back 20 is a bag storage area 24.

With reference again to FIG. 1, bag storage area 24 is used to store one or more golf bags 26 containing golf clubs 28. The bottom of golf bag 26 rests on a bottom 30 of a cart body 36. The upper portion of the golf bag is supported by a U-shaped bag support 32 that prevents golf bag 26 from tipping over. Bag support 32 is preferably a molded plastic part with straps 54 attached to it to secure the golf bag to the bag support. Bag support 32 is mounted onto frame extensions 38A and 38B of cart 10 using fastening means (not shown), as for example threaded bolts and nuts. Frame extensions 38A and 38B are made of metal and attached to rear frames 14A and 14B by fastening means, welding or are a continuous extension of the rear frames.

Referring again to FIG. 1, bag storage area 24 is generally formed as part of cart body 36 that opens toward the rear of the cart. The bag storage area is defined by bottom 30, two opposite sides 23, 25 and seat back 20. Top 12 has a front edge 11 and a rear edge 13 and is located above passenger compartment 22. The top does not cover the bag storage area to allow the player to remove golf clubs 28 from golf bag 26 without hitting the golf club on the underside of top 12 while trying to lift the golf club out of the golf bag. Therefore, the bag storage area and the golf bag are exposed to rainfall. In order to protect bag storage area 24 it is necessary to have a cover that can be folded out of the way so that the player may remove the golf clubs without being hindered by a covering directly above golf bag 26.

Figure 2:
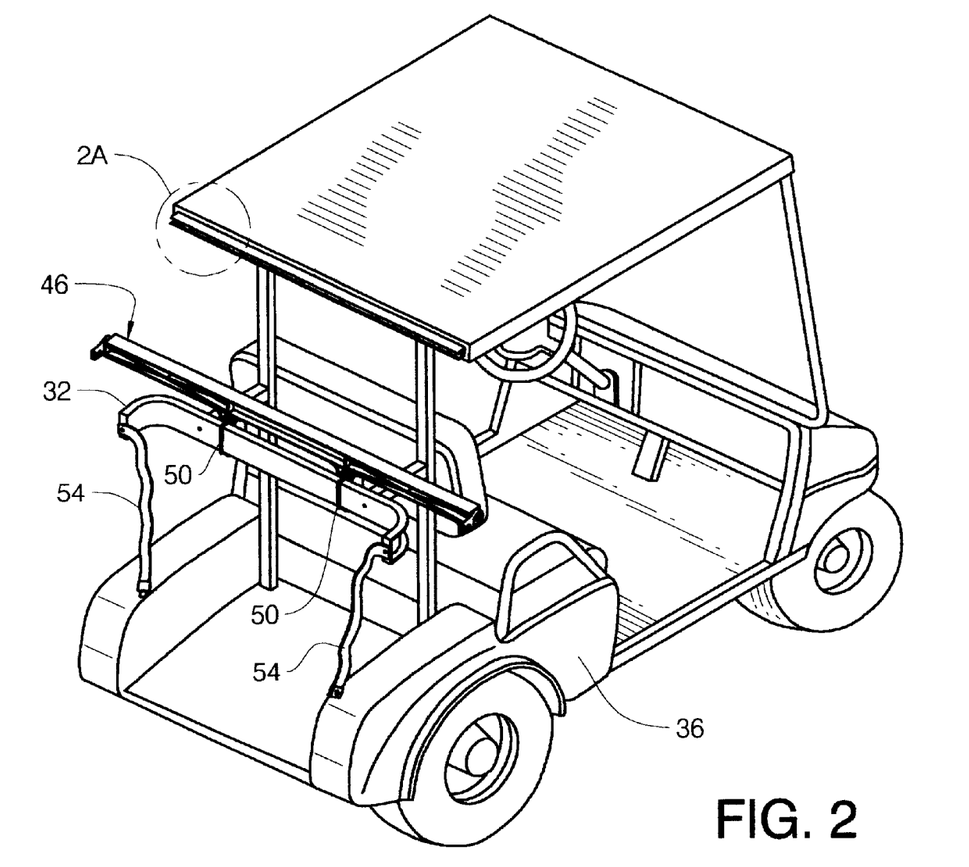
FIG. 2 is a rear perspective view of the golf cart with canopy attachment members mounted to the cart.
Figure 2A:
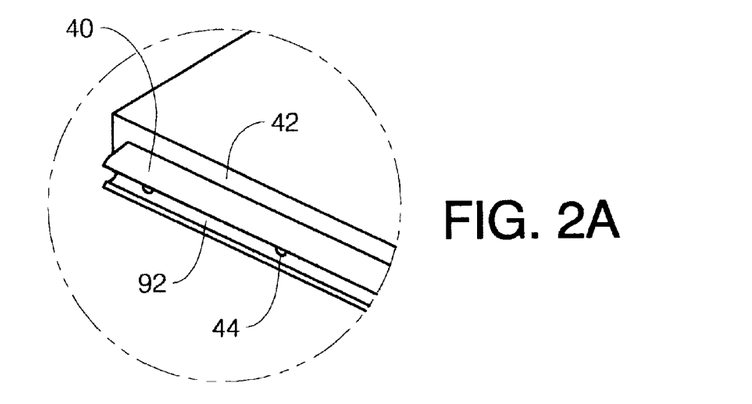
FIG. 2A is an enlarged partial view of the channel attached to the rear of the top.
Figure 4:
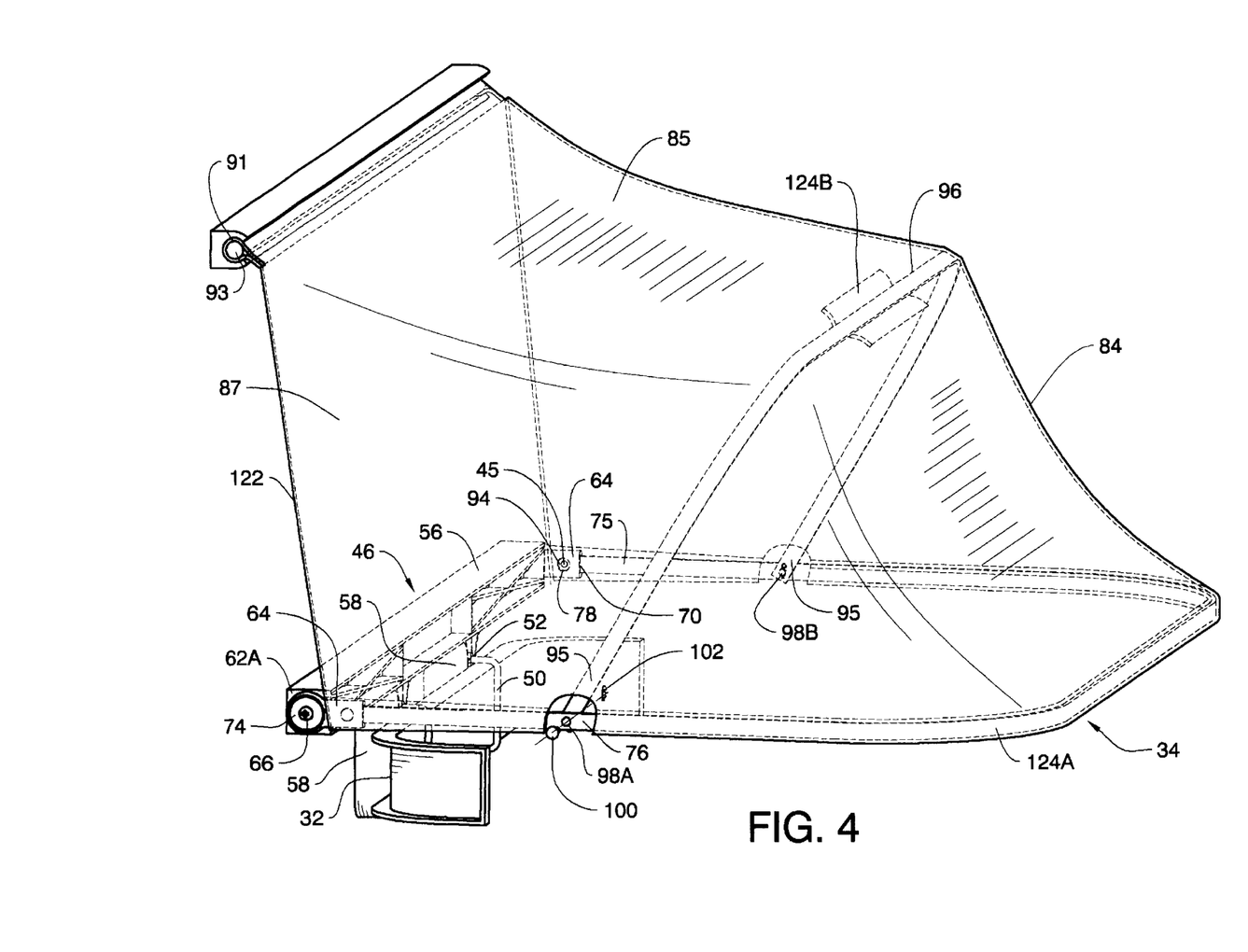
FIG. 4 is a side perspective view of the embodiment of the present invention attached to the cart's bag support bracket without the cart present and with the cover extended.

FIGS. 2 and 2A show the components necessary to mount an embodiment of this invention referred to as a canopy assembly 34, shown in FIG. 3, to cart 10. A channel 40 is secured to a rear face 42 of top 12 preferably using rivets 44. However, screws, bolts or other fastening means could be used in place of rivets 44. A base member 46 is a structural bracket that is attached to bag support 32 by U-bolts 50, as shown in FIGS. 2 and 4. The U-bolts surround the bag support and pass through holes 52 in flanges 58.

The channel, shown in FIGS. 2 and 2A, is preferably one continuous piece of extruded aluminum, however, extrude plastic will also work. The channel is preferably elongated having a width about equal to the width of face 42 on top 12. The channel has a substantially C-shaped cross section with a rearward opening 92.

A canopy 84, shown in FIGS. 3 and 4, has a rolled and a sewn top edge 90 forming a sleeve 91 that a rod 93 is slid endwise into until the end of rod 93 corresponds to the ends of the sleeve forming rounded top edge 90. Rod 93 has a length about the same as the length of channel 40. The sleeve and rod are sized to allow them to be inserted as an assembly endwise into the C-shaped cross section of channel 40. Top edge 90 has a diameter larger than opening 92 in channel 40 preventing the top edge from passing through opening 92, therefore, securing the top edge within channel 40. Rod 93 may be constructed of a rigid material as for example plastic or metal.

Figure 5:
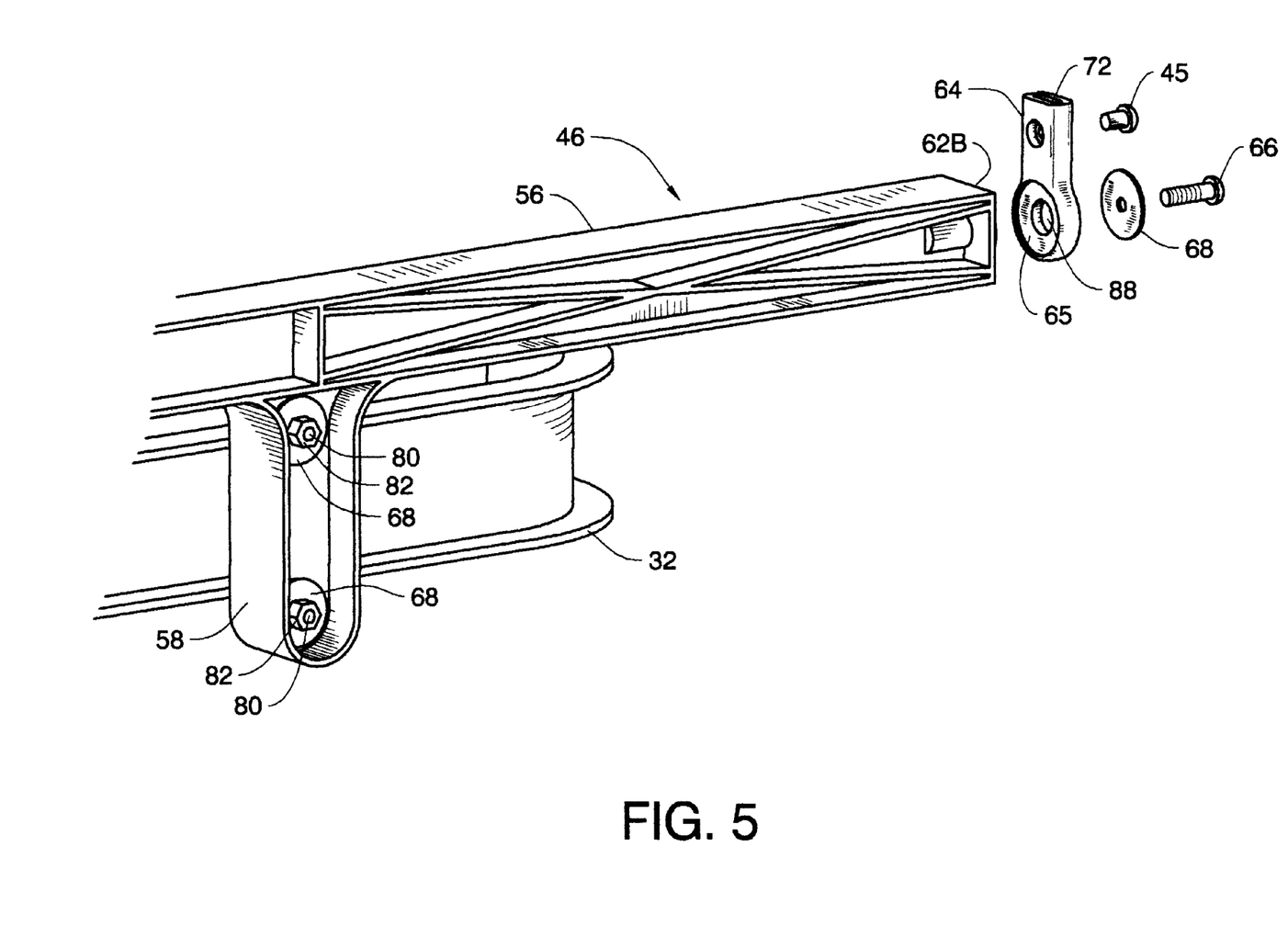
FIG. 5 is a partial rear perspective view of the base member secured to the bag support with the pivot arm and associated hardware exploded, the canopy and cart are eliminated from clarity.

As shown in FIGS. 4 and 5, U-bolts 50 are used to secure base member 46 to bag support 32 and are secured using washers 68 placed onto U-bolt ends 80 and threaded nuts 82 that thread onto ends 80 of the U-bolts. When the nuts are tightened, flanges 58 contact the back face of bag support 32 clamping them together. U-bolts 50 are preferably made from metal as for example steel.

Figure 6A:
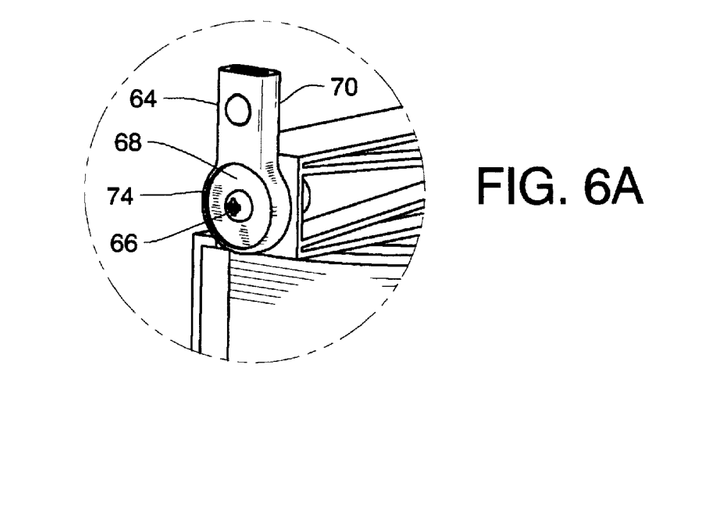
FIG. 6A is an enlarged partial view of the pivot arm mounted on the base member.
Figure 7:
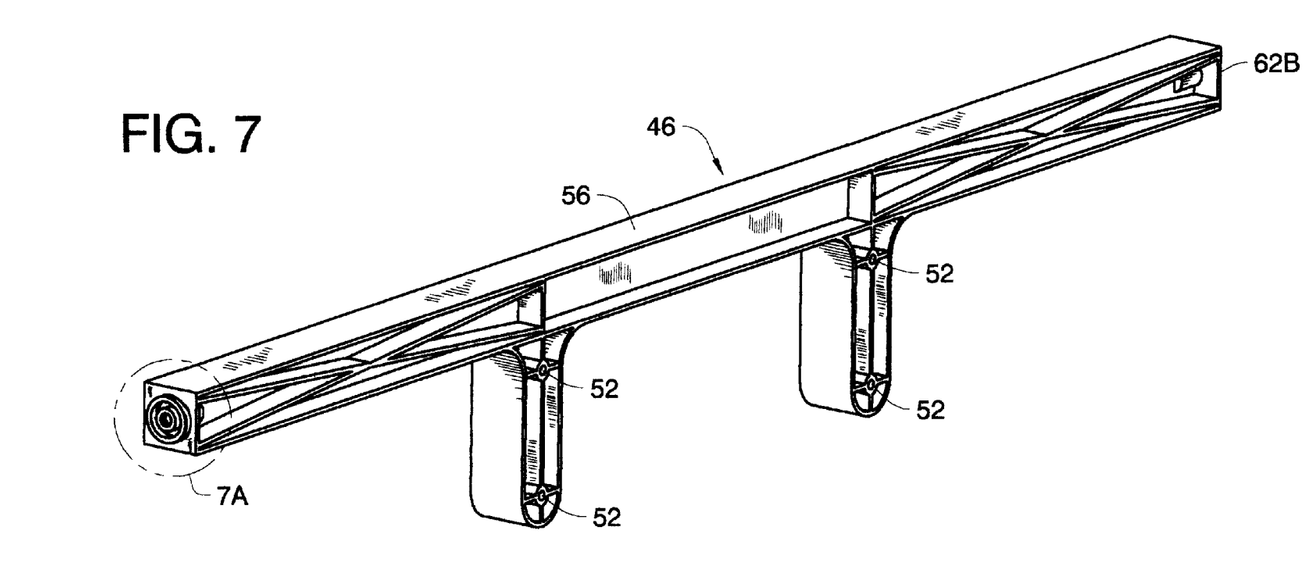
FIG. 7 is a rear perspective view of the base member only.
Figure 7A:
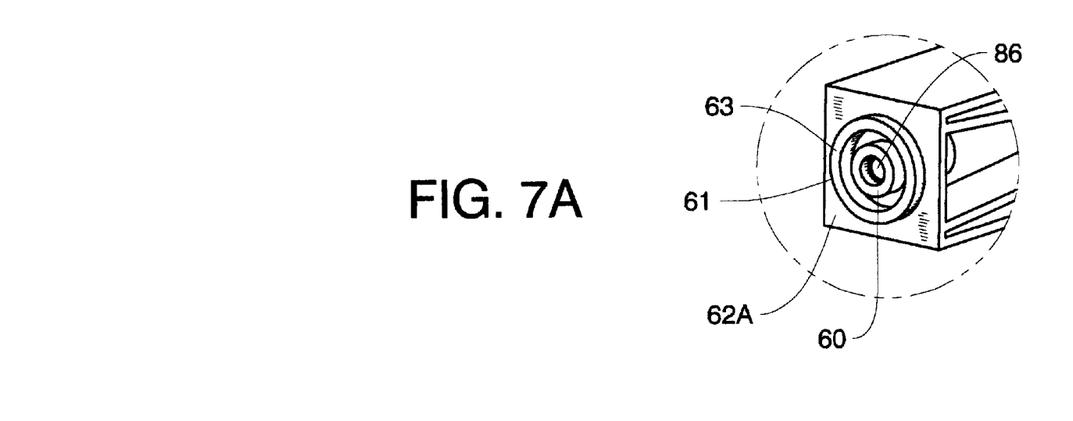
FIG. 7A is an enlarge partial view of the end of the base member.

With reference to FIGS. 5, 7 and 7A, base member 46 is preferably one continuous piece of high strength molded plastic, as for example nylon, with a beam 56 spanning the upper portion and two mounting flanges 58 extending from the bottom of the beam. The width of the beam corresponds to the width of the bag storage area. End faces 62A and 62B are located on opposite ends of beam 56. A cylindrical inner boss 60 extends from each end face 62A and 62B to form a mounting cylinder for a pivot arm 64, shown in FIG. 6A, to mount onto. A cylindrical outer ring 61 also extends off of end faces 62A and 62B surrounding inner boss 60. Both the inner boss and the outer ring are formed as part of base member 46. The outer ring provides a mating surface 63 that contacts a pivot face 65 on pivot arm 64 when the pivot arm is assembled onto inner boss 60 using a screw 66. The surface to surface contact between surface 63 and pivot face 65 creates constant resistance to rotation of the pivot arm due to friction between them. This resistance holds canopy 84, shown in FIG. 8, in a folded position when the user forces the canopy upward to allow access to golf clubs 28 and prevents the weight of canopy 84 from rotating pivot arms 64 downward which would result in extending the canopy. Beam 56 has a generally I-beam shaped cross section that provides structural rigidity for the base member 46. Flanges 58 provide mounting extensions of the beam that contact the back face of bag support 32, as previously described. The flanges contain holes 52 that the ends of the U-bolts pass through. The flanges are formed as a continuous part of beam 56.

Figure 6:
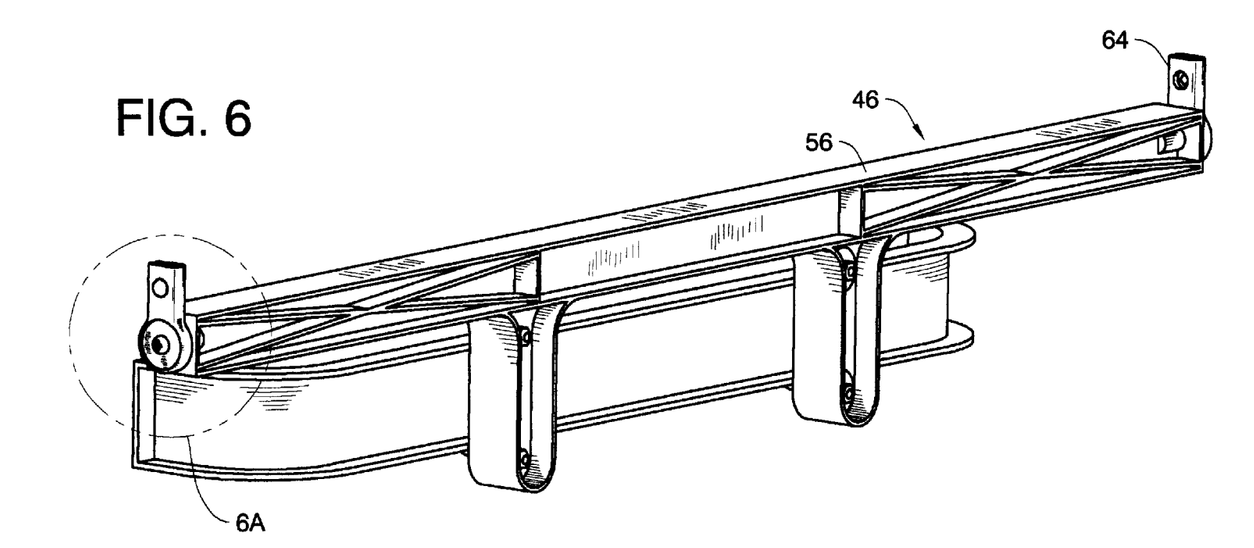
FIG. 6 is a rear perspective view of the base member including the pivot arms secured to the bag support without the cart or the canopy present.

With reference to FIGS. 6A, 7 and 7A, on each end of beam 56 are end faces 62A and 62B. Inner boss 60, formed as part of the base member, contains a small diameter screw bore 86 in the center of the boss. The bore has a diameter slightly smaller than the outside diameter of the threads on screw 66 and is sized to allow screw 66 to self-tap into the screw bore to secure pivot arm 64 onto inner boss 60 on each end of beam 56, as shown in FIG. 6. Washer 68 is used to distribute the clamp force of screw 66 on pivot arm 64 holding the pivot arm on the inner boss and keeping mating surface 63 in contact with the pivot face 65, shown in FIG. 5, on pivot arm 64.

With reference to FIGS. 5, 6A and 7A, pivot arm 64 is a separately molded plastic part made from a high strength, molded plastic, as for example nylon. The pivot arm contains a pivot hole 88 that has a diameter that is slightly larger than the outside diameter of inner boss 60 allowing the pivot arm to rotate around the inner boss when the pivot arm is slid over the boss and secured in place by washer 68 and screw 66, as shown in FIG. 6A. Both the screw and the washer are preferably made of steel. Pivot arm 64 extends outward from a cylindrical mounting end 74 and transitions to a rectangular cross section receiving a end 70, shown in FIG. 6A, that has a hollowed rectangular socket 72, shown in FIG. 5, that is sized to receive end 75 of a support bracket 76 as shown in FIG. 4.

With reference again to FIGS. 4 and 5, support bracket 76 is used to structurally support canopy 84 and is generally a U-shaped continuous rigid support with opposite ends 75 that have a rectangular cross section to facilitate insertion into socket 72. In this way, the support bracket is pivotally connected to base member 46. The length of support bracket 76 corresponds to the size of bag storage area 24 to ensure that when the support bracket is extended it covers the majority of the bag storage area. Near the ends of the support bracket 76 are rivet holes 94 that align with clearance holes 78 in the pivot arms to allow the insertion of rivets 45. Rivets 45 secure ends 75 of support bracket 76 into sockets 72 and prevent the ends of the support bracket from coming out of sockets 72 because the rivets cannot slide through sockets 72.

With reference again to FIG. 3, canopy 84 is made from a thin sheet of flexible water-resistant material like vinyl that is sewn together. Canopy 84 is defined by a canopy top 85 and two generally opposing canopy sides 87 and 89. The canopy has a bottom edge 120, top edge 90 and a front canopy edge 122 that define the limits of the canopy.

With reference again to FIG. 4, support bracket 76 and a mid-support bracket 96 provide structural support for the canopy. The mid-support bracket is generally a U-shaped continuous support with opposite ends 95 that have rectangular cross sections. The length of the mid-support bracket corresponds to the desired shape of the canopy that it supports. Both the support bracket and the mid-support bracket are made of a semi-rigid material like spring steel or a high strength plastic, as for example nylon. Both the support bracket and mid-support bracket pass through sewn channels 124A and 124B respectively in the canopy to locate them in the desired position within canopy 84. In this way, the canopy is attached to support bracket 76 and mid-support bracket 96. Support bracket 76 has pin holes 98A that align with pin holes 98B in mid-support bracket 96 to allow pins 100 to pass through, pivotally connecting the support bracket and mid-support bracket together. Lock pins 102 are assembled onto the ends of pins 100 to secure the pins in position. In this way, the mid-support bracket is free to pivot about pins 100 relative to support bracket 76. Support bracket 76 and mid-support bracket 96 together makeup a frame structure for supporting the canopy.

With reference again to FIGS. 3 and 4, canopy assembly 34 is attached to cart 10 and is extended to protect golf bag 26 and golf clubs 28 from adverse weather conditions like rainfall. In the extended position shown, canopy 84 is pulled taunt from within channel 40 and stretches over mid-support bracket 96 and down over support bracket 76. Therefore, channel 40, mid-support bracket 96 and support bracket 76 cooperate to support canopy 84. In this way, canopy 84 covers bag storage area 24 and remains in this position due to the weight of the canopy, support bracket 76 and mid-support bracket 96.

Figure 8:
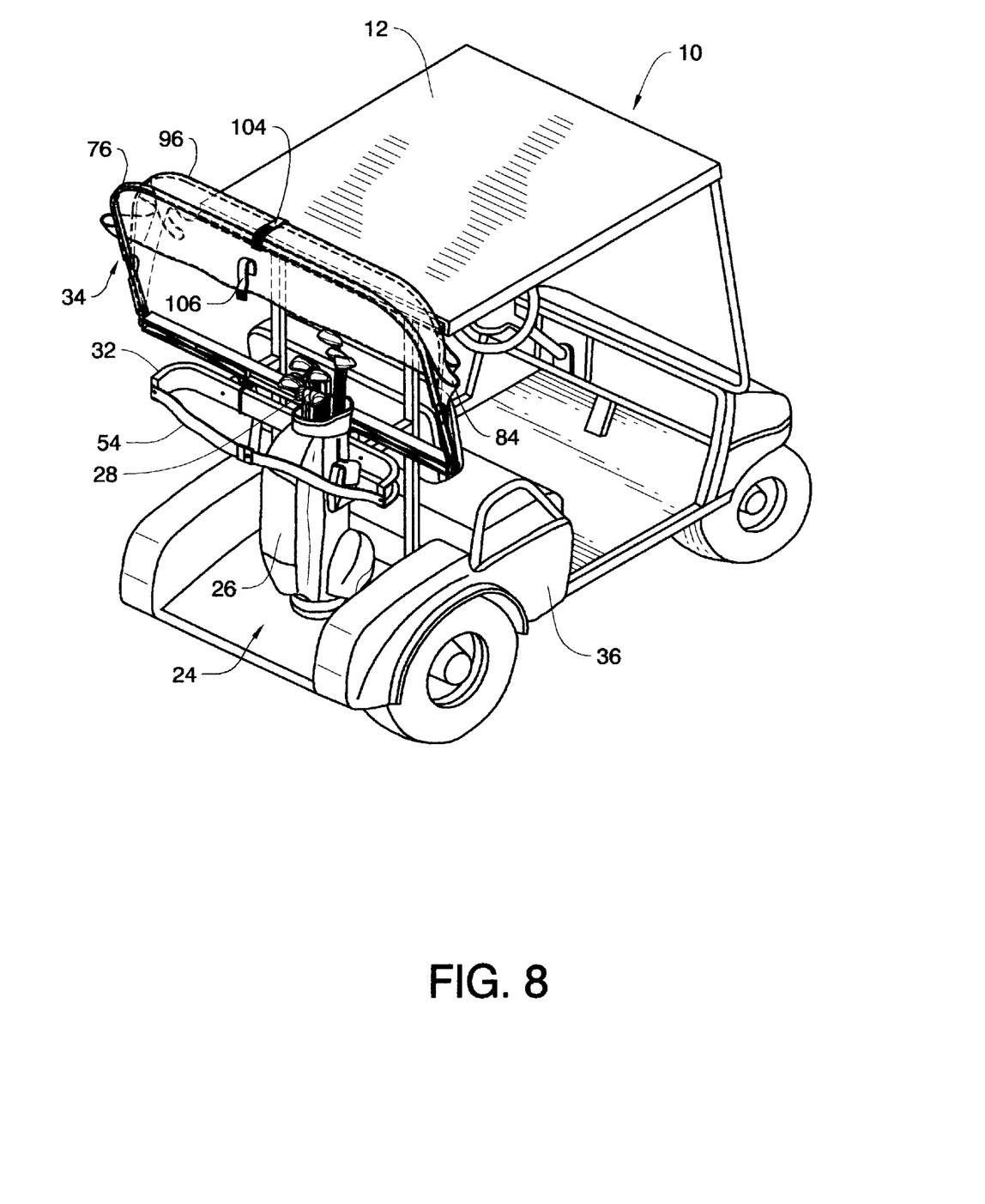
FIG. 8 is a perspective view of the cart with the embodiment of the present invention attached and the canopy folded up to allow access to the golf clubs.

With reference to FIG. 8, canopy assembly 34 is attached to cart 10 and is in a folded up position to allow access to golf bag 26 and golf clubs 28. Canopy 84 is folded up from the extended position, as shown in FIG. 4, by gripping the bottom of canopy 84 near support bracket 76 and lifting the support bracket upwardly, toward the back of top 12. The moment force created from this lifting action causes pivot arms 64 to rotate around inner bosses 60. The mid-support bracket pivots relative to support bracket 76 around pins 100. At approximately the halfway point of folding up the canopy support bracket 76 contacts mid-support bracket 96 with the cover material folded in-between them and begins to rotate upwardly toward the back of top 12. When the lifting action is completed, as shown in FIG. 8, both support bracket 76 and mid-support bracket 96 are substantially vertical and the user may release the canopy. The friction between mating surfaces 63 on beam 56 and pivot face 65 on each pivot arm 64 prevents the canopy from falling back into the extended position. Therefore, the canopy is held in the folded position, as shown in FIG. 8, by the friction between mating surface 63 and pivot face 65. If the weather conditions improve and the player wishes to have the cover retained in the folded position while driving the cart, he or she may choose to fasten the cover in this position using the hook and loop fastening method, shown in FIG. 8. A hook strap 104 is sewn to the canopy on the outer face near top edge 90 and is wrapped around the folded canopy and attached to a loop strap 106 that is sewn to the inner face of the canopy near the top edge. The player may extend the canopy by separating the hook strap from the loop strap and pulling the bottom of canopy 84 near support bracket 76 downwardly and toward the back of the cart. This will extend the cover over bag storage area 24, as shown in FIG. 3.

Figure 9:
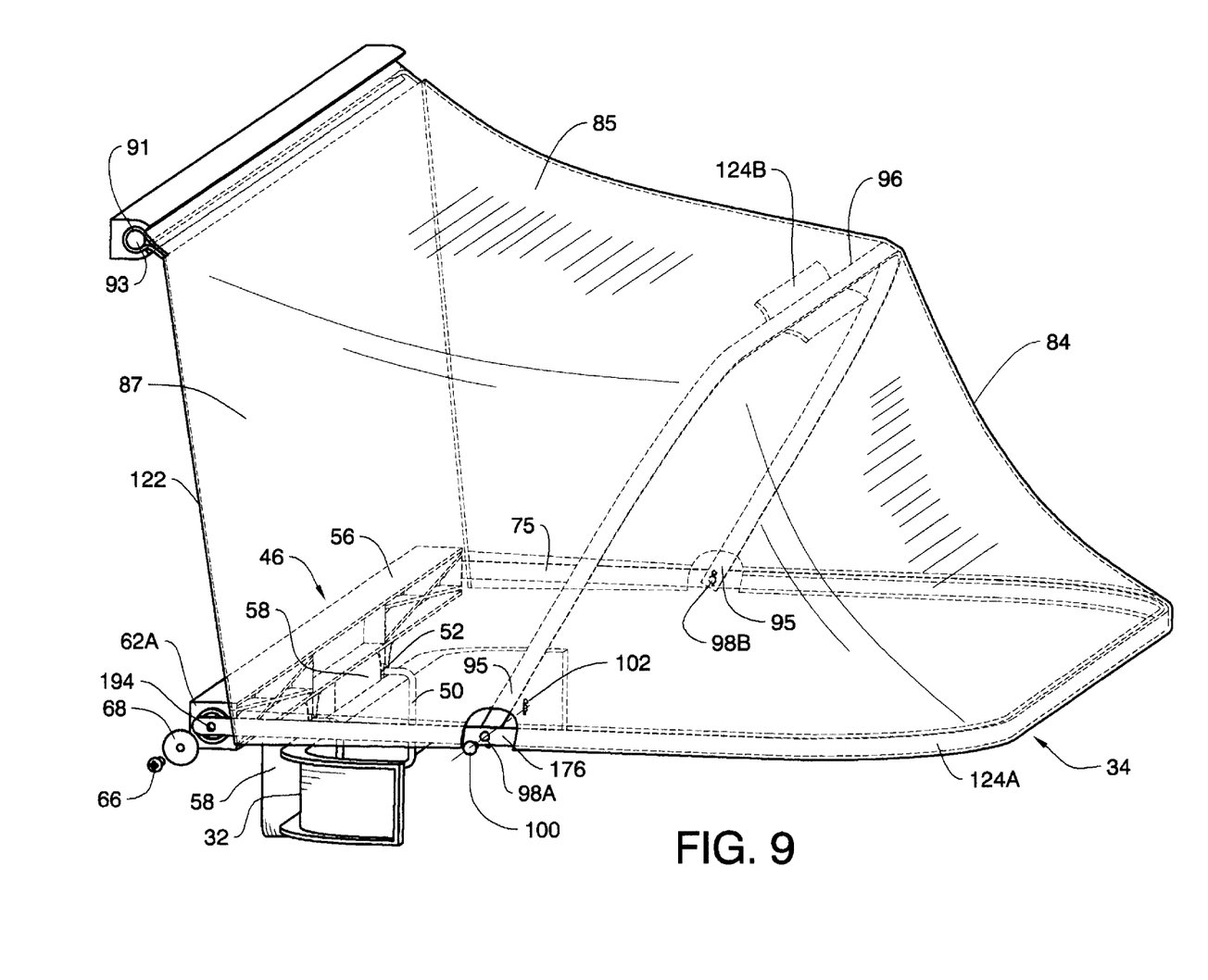
FIG. 9 is a side perspective view of alternative embodiment of the present invention attached to the cart's bag support bracket without the cart present and with the cover extended.

In a second embodiment of this invention, shown in FIG. 9, pivot arms 64 and rivet holes 94 are eliminated. Pivot holes 194 and assembled directly onto inner boss 60. In this embodiment, the modified support bracket 176 is pivotally attached directly to base member 46 in the same way as pivot arms 64, as previously described.

CONCLUSION, RAMIFICATIONS, AND SCOPE OF INVENTION

Accordingly, one skilled in the art will recognize that the canopy rain cover of this invention can be used for rain protection on a motorized golf cart easily and conveniently, can be installed just as easily using simple tools and is aesthetically pleasing when installed on the cart. Furthermore, this invention has the additional advantages in that;

(a) it provides a canopy rain cover that mounts to the bag support on a variety of different golf carts without having to modify the design for each;

(b) it provides a canopy rain cover that is relatively inexpensive having fewer and simpler parts than currently known covers;

(c) it provides a rain cover that is robust and durable; and (d) it provides a rain cover that is made up of components that are simple and inexpensive to manufacture.

Although the description above contains many specificities, these should not be construed as limiting the scope of the invention but as merely providing illustrations of some of the presently preferred embodiments of this invention. For example, the plastic molded base member 46 could be replaced with a steel or wood base member; the base member could have a different shape or be made an assembly of different parts; the U-bolts used to mount the base member to the bag support could be replaced with another fastening means like a threaded nut and bolt passing through the bag support; screw 66 fastening pivot arms 64 onto inner boss 60 could be replaced be snap fitting pivot hole 88 over a corresponding inner boss; one pivot arm 64 could be removed by only attaching one end of support bracket 76 to base member 46; pivot arm socket 72 could be eliminated with bracket 76 attaching another way to the pivot arm; pivot arms 64 could be eliminated by pivotally attaching support bracket 76 directly to base member 46; mid-support bracket 96 could also be directly attached to base member 46 or additional pivot arms 64 instead of attaching to the mid section of support bracket 76; both the support bracket and the mid-support bracket do not have to pass through sewn channels in the canopy, they could be attached using other fastening means like hook and loop straps; channel 40 could be replaced by another type of fastening means to connect the canopy's top edge to top 12, as for example, a hook strip attached to top 12 and a loop strip attached to the top edge of the canopy; and sleeve rod 93 could be eliminated by rolling and sowing top edge 90, etc.

Thus the scope of the invention should be determined by the appended claims and their legal equivalents, rather than by the examples given.

What is claimed is:

1. A canopy assembly for attaching a rearwardly extending canopy to a golf cart having a seating compartment, a golf bag compartment located rearwardly of said seating compartment, a top assembly including a top positioned over said seating compartment and additionally including front and rear laterally spaced apart and vertically extending frame members supporting said top, a golf bag support bracket located rearwardly of said seating compartment secured to said golf cart, said golf bag support bracket having straps for securing golf bags, said canopy assembly being moveable between an extended first position where it at least partially covers said golf bag compartment and a folded second position where it is folded out of the way to allow access to said golf bag compartment, said canopy assembly comprising:

a canopy having a top edge, a bottom edge and sides;

means for attaching said top edge of said canopy to the upper rear portion of said top assembly;

a frame structure for supporting said canopy;

a base member for supporting said frame structure;

means for securing said base member to said golf bag support bracket; and means for pivotally attaching said frame structure to said base member.

2. The canopy assembly according to claim 1 further comprising means for attaching said frame structure to said canopy.

3. The canopy assembly according to claim 2 wherein said means for attaching said frame structure to said canopy includes at least one sleeve sewn into said canopy wherein at least a portion of said frame structure passes through said sleeve.

4. The canopy assembly according to claim 1 wherein said means for pivotally attaching said frame structure to said base member includes assembling a first hole near a first end of said frame structure and a second hole near a second end of said frame structure onto mating bosses extending from said base member and securing said frame structure on said bosses.

5. The canopy assembly according to claim 1 wherein said means for attaching said top edge of said canopy to the upper rear portion of said top assembly includes a channel secured to the upper rear portion of said top assembly wherein said top edge is secured within said channel.

6. The canopy assembly according to claim 1 wherein said frame structure includes at least one rigid U-shaped bracket.

7. The canopy assembly according to claim 1 wherein said base member is a molded plastic part.

8. The canopy assembly according to claim 1 wherein said means for securing said base member to said golf bag support bracket includes at least one U-bolt surrounding said golf bag support bracket with the ends of said U-bolt passing through openings in said base member and at least one threaded nut that is threaded onto at least one threaded end of said U-bolt.

9. The canopy assembly according to claim 1 wherein said means for securing said base member to said golf bag support bracket includes at least one threaded fastener passing through said golf bag support bracket and continuing into said base member.

10. The canopy assembly according to claim 1 wherein said means for pivotally attaching said frame structure to said base member includes at least one pivot arm pivotally secured to said base member using means for securing said pivot arm to said base member wherein at least one end of said frame structure is secured to said pivot arm.

11. The canopy assembly according to claim 10 wherein said means for securing said pivot arm to said base member includes assembling an axis hole in said pivot arm onto a boss extending from said base member and using a fastener for securing said pivot arm onto said boss.

12. The canopy assembly according to claim 10 wherein said pivot arm includes a mating face that contacts a corresponding surface on said base member, whereby the friction between said mating face and said surface on said base member resists rotation of said pivot arm relative to said base member.

13. A canopy assembly for attaching a rearwardly extending canopy to a golf cart having a front and a rear, a frame, a seating compartment, a golf bag compartment located rearwardly of said seating compartment, a top assembly including a top positioned over said seating compartment and additionally including front and rear laterally spaced apart and vertically extending frame members supporting said top, a golf bag support bracket located rearwardly of said seating compartment, and secured to said frame members, said golf bag support bracket having straps for securing golf bags, said canopy assembly being moveable between an extended first position where it at least partially covers said golf bag compartment and a folded second position where it is at least partially folded out of the way to allow access to said golf bag compartment, said canopy assembly comprising:
  a canopy having a top edge, a bottom edge and sides;
  means for attaching said top edge of said canopy to said top assembly;
  at least one support beam for supporting said canopy, said support beam having a first end and a second end;
  a base member for supporting said support beam, said base member having at least one mounting flange;
  means for securing said base member to said golf bag support bracket; and
  means for pivotally attaching said support beam to said base member,
    wherein said means for securing said base member to said golf bag support bracket does so by clamping said mounting flange onto said golf bag support bracket.

14. The canopy assembly according to claim 13 wherein said means for securing said base member to said golf bag support bracket includes at least one U-bolt surrounding said golf bag support bracket with the ends of said U-bolt passing through openings in said base member and at least one threaded nut that is threaded onto a corresponding threaded end of said U-bolt.

15. The canopy assembly according to claim 13 wherein said means for securing said base member to said golf bag support bracket includes at least one threaded fastener passing through said golf bag support bracket and continuing into said base member.

16. The canopy assembly according to claim 13 wherein said means for attaching said top edge of said canopy to said top assembly includes a channel secured to said top assembly wherein said top edge is secured within said channel.

17. The canopy assembly according to claim 13 wherein said means for attaching said top edge of said canopy to said top assembly includes a hook and loop fastener assembly including a hook strip and a loop strip secured to said canopy and said top assembly.

18. The canopy assembly according to claim 13 wherein said means for pivotally attaching said support beam to said base member includes assembling a first hole near said first end and a second hole near said second end of said support beam onto mating bosses extending from said base member and securing said support beam on said bosses.

19. The canopy assembly according to claim 13 wherein said support beam for supporting said canopy includes a rigid U-shaped bottom support beam and a rigid U-shaped mid-support beam that is pivotally attached to said bottom support beam.

20. A canopy assembly for attaching a rearwardly extending canopy to a golf cart having a front and a rear, a structural frame, a seating compartment, a golf bag compartment located behind said seating compartment, a top assembly including a top positioned over said seating compartment and additionally including front and rear laterally spaced apart and vertically extending frame members supporting said top, a golf bag support bracket located behind said seating compartment and secured to said structural frame of said golf cart, said canopy assembly being moveable between an extended first position where it at least partially covers said golf bag compartment and a folded second position where it is at least partially folded out of the way to allow access to said golf bag compartment, said canopy assembly comprising:
  a canopy having a top edge and a bottom edge;
  a channel;
  means for fastening said channel to the rearward portion of said top assembly wherein said top edge of said canopy is secured within said channel;
  a rigid U-shaped support beam for supporting said canopy having a first end and a second end, said support beam having a first hole near said first end and a second hole near said second end;
  a base member for supporting said support beam;
  at least one fastener for securing said base member to said golf bag support bracket;
  a first boss and a second boss extending from opposite ends of said base member wherein said first hole is assembled onto said first boss and said second hole is assembled onto said second boss; and
  fasteners for securing said first end and said second end of said support beam onto said first boss and said second boss,
    whereby said support beam is pivotally attached to said base member.

21. A canopy assembly for attaching a rearwardly extending canopy to a golf cart having a seating compartment, a golf bag compartment located rearwardly of said seating compare, a top assembly including a top positioned over said seating compartment and additionally including front and rear laterally spaced apart and vertically extending frame members supporting said top, a golf bag support bracket located rearwardly of said seating compartment secured to said golf cart, said canopy assembly being moveable between an extended first position where it at least partially covers said golf bag compartment and a folded second position where it is folded out of the way to allow access to said golf bag compartment, said canopy assembly comprising:

- a canopy having a top edge, a bottom edge and sides;
- means for attaching said top edge of said canopy to the upper rear portion of said top assembly;
- a frame structure for supporting said canopy;
- a base member for supporting said frame structure;
- means for securing said base member to said golf bag support bracket; and
- means for pivotally attaching said frame structure to said base member,
    - wherein said means for securing said base member to said golf bag support bracket clamps to the outer surface of said bag support bracket.

22. A canopy assembly for attaching a rearwardly extending canopy to a golf cart having a seating compartment, a golf bag compartment located rearwardly of said seating compartment, a top assembly including a top positioned over said seating compartment and additionally including front and rear laterally spaced apart and vertically extending frame members supporting said top, a golf bag support bracket located rearwardly of said seating compartment secured to said golf cart, said golf bag support bracket having straps for securing golf bags, said canopy assembly being moveable between an extended first position where it at least partially covers said golf bag compartment and a folded second position where it is folded out of the way to allow access to said golf bag compartment, said canopy assembly comprising:

- a canopy having a top edge, a bottom edge and sides;
- means for attaching said top edge of said canopy to the upper rear portion of said top assembly;
- a frame structure for supporting said canopy;
- a base member for supporting said frame structure;
- means for securing said base member to said golf bag support bracket; and
- means for pivotally attaching said frame structure to said base member,
    - wherein said means for securing said base member to said golf bag support bracket substantially surrounds said golf bag support bracket.

* * * * *